United States Patent
Shinozaki (10) Patent No.: US 9,136,726 B2
(45) Date of Patent: Sep. 15, 2015

(54) BATTERY SYSTEM FOR MOVABLE OBJECT AND CONTROLLING METHOD FOR THE SAME

(75) Inventor: Akihiro Shinozaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 393 days.

(21) Appl. No.: 13/811,191

(22) PCT Filed: Jul. 27, 2011

(86) PCT No.: PCT/JP2011/067129
§ 371 (c)(1),
(2), (4) Date: Mar. 4, 2013

(87) PCT Pub. No.: WO2012/014941
PCT Pub. Date: Feb. 2, 2012

(65) Prior Publication Data
US 2013/0175975 A1 Jul. 11, 2013

(30) Foreign Application Priority Data
Jul. 29, 2010 (JP) ................................. 2010-171069

(51) Int. Cl.
*H02J 7/00* (2006.01)
*H02J 7/14* (2006.01)
(Continued)

(52) U.S. Cl.
CPC ............. *H02J 7/007* (2013.01); *B60L 11/1864* (2013.01); *H01M 10/441* (2013.01);
(Continued)

(58) Field of Classification Search
CPC ............. H02J 7/00; H02J 7/02; H01M 10/44
USPC ................... 320/104, 106, 134, 136; 701/22; 290/40 C
See application file for complete search history.

(56) References Cited

U.S. PATENT DOCUMENTS 5,789,882 A * 8/1998 Ibaraki et al. ................. 318/148
5,841,201 A * 11/1998 Tabata et al. ................ 290/40 C
(Continued)

FOREIGN PATENT DOCUMENTS

CN         1237681 C    1/2006
CN        101508381 A   8/2009
(Continued)

OTHER PUBLICATIONS

Chinese Office Action dated Aug. 12, 2014 issued in the corresponding Chinese Application No. 201180035846.3 with English translation.

*Primary Examiner* — M'Baye Diao
(74) *Attorney, Agent, or Firm* — Birch, Stewart, Kolasch & Birch, LLP (57) ABSTRACT

A battery system for a movable object is mounted on the movable object having a charger and a load unit including a plurality of loads electrically driven for different purposes. The battery system is provided with a plurality of battery packs, a power control circuit for changing a connection state between the battery packs and the charger and a connection state between the battery packs and the load unit, a memory unit for storing operation information, an estimation unit for estimating a power consumption pattern in the operation cycle based on the operation information and a controller for switching the power control circuit to cover the power consumption by the load unit according to the power consumption pattern.

20 Claims, 7 Drawing Sheets

(51) Int. Cl.
*F02B 3/00* (2006.01)
*B60L 11/00* (2006.01)
*B60L 11/18* (2006.01)
*H01M 10/44* (2006.01)
*H01M 10/46* (2006.01)
*H02J 1/10* (2006.01)
*H01M 10/48* (2006.01)
*H02J 3/00* (2006.01)
*H01M 10/0525* (2010.01)
*H01M 10/42* (2006.01)

(52) U.S. Cl.
CPC ............ *H01M 10/46* (2013.01); *H01M 10/48* (2013.01); *H02J 1/10* (2013.01); *H02J 7/0013* (2013.01); *B60L 2260/54* (2013.01); *H01M 10/0525* (2013.01); *H01M 2010/4271* (2013.01); *H01M 2220/20* (2013.01); *H02J 2003/003* (2013.01); *Y02T 10/7005* (2013.01); *Y02T 10/7011* (2013.01); *Y02T 10/7061* (2013.01)

(56) References Cited

U.S. PATENT DOCUMENTS

| | | | |
|---|---|---|---|
| 6,621,250 B1 * | 9/2003 | Ohkubo et al. | 320/136 |
| 6,741,065 B1 | 5/2004 | Ishii et al. | |
| 6,925,369 B2 * | 8/2005 | Obayashi et al. | 701/36 |
| 7,355,292 B2 * | 4/2008 | Yamashita | 290/40 C |
| 8,600,593 B2 * | 12/2013 | Ohno | 701/22 |
| 2005/0049757 A1 | 3/2005 | Funakura et al. | |
| 2012/0121952 A1 * | 5/2012 | Majima et al. | 429/90 |

FOREIGN PATENT DOCUMENTS

| | | |
|---|---|---|
| JP | 9-298806 A | 11/1997 |
| JP | 2001-45673 A | 2/2001 |
| JP | 2004-147477 A | 5/2004 |
| JP | 2006-296109 A | 10/2006 |
| JP | 3890168 B2 | 3/2007 |

* cited by examiner

|  | T1 | T2 | T3 | T4 | T5 |
|---|---|---|---|---|---|
| TRAVEL LOAD 6a | ON | ON | OFF | ON | OFF |
| WORK LOAD 6b | OFF | ON | ON | OFF | OFF |
| CHARGEABLITILY | NO | NO | YES | NO | YES |

|  | T1 | T2 | T3 | T4 | T5 |
|---|---|---|---|---|---|
| BANK 2 | DISCHARGE | STANDBY | CHARGE | DISCHARGE | CHARGE |
| BANK 3 | STANDBY | DISCHARGE | DISCHARGE | STANDBY | CHARGE |
| BANK 4 | STANDBY | DISCHARGE | DISCHARGE | STANDBY | CHARGE |

BATTERY SYSTEM FOR MOVABLE OBJECT AND CONTROLLING METHOD FOR THE SAME

TECHNICAL FIELD

The present invention relates to a technical field of a battery system for a movable object and a method of controlling charge and discharge of the battery system which is mounted on a movable object with a load unit including a plurality of loads electrically driven for different purposes and which includes a plurality of battery packs, each consisting of a plurality of secondary battery cells.

BACKGROUND ART

For instance, the movable objects include a vehicle, a ship and an aircraft, which are powered by electric power discharged from a battery system mounted on the movable object. In the battery system of this type, it is well known to use a battery pack with a combination of rechargeable cells. Particularly, as a battery system mounted on a movable object requires a measurable amount of electric power, it is known to increase a discharge capacity by connecting a plurality of battery packs in parallel or in series.

For instance, disclosed in Patent Literature 1 is a battery system equipped with a plurality of battery packs and a memory provided integrally in each battery pack for storing information about charge and discharge states of the battery packs such as a charge level and a temperature of the battery pack. Upon charging or discharging the battery packs, a controller refers to the information stored in the memories so as to fully charge the battery packs in an ascending order of a remaining charge level, and fully discharge the battery packs in a descending order of a remaining charge level.

CITATION LIST

Patent Literature

[PTL 1]
JP 3890168 B

SUMMARY

Technical Problem

According to Patent Literature 1, it is assumed that the system is used for those batteries whose cell life is hardly affected even when the battery pack is fully charged to a maximum level and fully discharged to a minimum level, such as a battery pack mainly constituted of nickel-cadmium secondary cells. However, by repeating the full-charge and full-discharge in this manner, the battery life becomes short in the case of using battery packs constituted of lithium-ion secondary cells that have become popular as a secondary battery.

Further, according to Patent Literature 1, regardless of the power consumption of the load connected to the battery system, the battery packs are fully charged sequentially. For instance, in the case of charging the battery system in advance to cover power consumption expected when the unit having the power system mounted thereon is used immediately, the battery packs are fully charged even if the expected power consumption is small. It is extremely inefficient to perform charging in large amounts for the small power consumption.

Further, Patent Literature 1 suggests that the battery system can be efficiently operated by performing charge and discharge in a parallel manner using a plurality of battery packs. However, there is no detailed description on how to make the operation of the battery system more efficient by selecting which battery pack to be charged or discharged among the plurality of battery packs. For instance, upon selecting which battery pack to be charged and which battery pack to be discharged, the selection control is made without considering the power consumption by the load unit and thus, it is difficult to perform efficient charge-discharge control according to the operation condition of the load unit.

In view of the above problems, it is an object of embodiments of the present invention to provide a battery system for a movable object and a controlling method for the battery system formed by a plurality of battery packs mounted on the movable object, which is capable of controlling charge and discharge thereof efficiently and flexibly.

Solution to Problem

To solve the above problem, the present invention provides a battery system for a movable object on which the battery system is mounted and which comprises a charger and a load unit including a plurality of loads electrically driven for different purposes. The battery system comprises:

a plurality of battery packs formed by connecting a plurality of secondary cells in series or in parallel;

a power control circuit for changing a connection state between the plurality of battery packs and the charger and a connection state between the plurality of battery packs and the load unit;

a memory for storing in advance operation information about operation patterns of each of the loads in an operation cycle of the movable object;

an estimation unit for estimating a power consumption pattern in the operation cycle based on the operation information stored in the memory; and a controller for controlling switching of the power control circuit so as to cover power consumption of the load unit in accordance with the power consumption pattern estimated by the estimation unit.

According to the present invention, by controlling the power control circuit based on the operation information, it is possible to change the connection state between the plurality of battery packs and the charger as well as the connection state between the plurality of battery pack and the load unit. Thus depending on the operation pattern of each of the loads in the operation cycle of the movable object, it is possible to charge at least one battery pack selected from the plurality of battery packs by connecting the at least one battery pack to the charger, and also to discharge electric power from the remaining battery packs to the load unit. As a result, it is possible to control charge and discharge of the battery packs efficiently and flexibly in accordance with the power consumption pattern estimated from the operation information, and it is particularly possible to perform charge or discharge in parallel with respect to each of the battery packs independently and concurrently.

In an embodiment of the present invention, the controller calculates an amount of power consumption during a prescribed period of time in the operation cycle based on the power consumption pattern having been estimated by the estimation unit, and controls switching of the power control circuit so that total power discharge from a battery pack of the plurality of battery packs during the prescribed period of time becomes greater than the calculated amount of power consumption, said battery pack of the plurality of battery packs discharging electric power to cover the power consumption.

According to the embodiment, by controlling switching of the power control circuit so that total power discharge from a battery pack of the plurality of battery packs during the prescribed period of time becomes greater than the calculated power consumption, the power control circuit can be controlled so as to discharge power from a required number of the battery packs to cover the calculated power consumption.

In another embodiment of the present invention, the controller calculates an amount of power consumption during a prescribed period of time in the operation cycle based on the power consumption pattern having been estimated by the estimation unit, and controls switching of the power control circuit so that total power discharge from a battery pack of the plurality of battery packs during the prescribed period of time becomes the closest to the calculated amount of power consumption, said battery pack of the plurality of battery packs discharging power to cover the power consumption.

According to said another embodiment, power can be discharged from as minimum number of the battery packs as needed to cover the power consumption. Thus, it is possible to avoid inefficient discharge from a larger number of the battery packs than necessary. For instance, in the case of charging the battery system in advance to cover the power consumption expected in the future, it is possible to effectively avoid inefficient control of fully charging the battery packs even when the expected power consumption is small.

In yet another embodiment of the present invention, the battery system for the movable object further comprises a charge level obtaining unit for obtaining a current charge level of the plurality of battery packs and the controller controls the power control circuit so as to keep the obtained charge level within a prescribed range.

According to yet another embodiment, by controlling the power control circuit so as to keep the obtained charge level within a prescribed range, it is possible to effectively prevent overcharge or overcharge of the battery pack. The "prescribed range" is herein defined, for instance, as an upper limit and a lower limit of the charge level defining the overdischarge and overcharge.

In an embodiment of the present invention, the battery system for the movable object further comprises an input unit for inputting the operation information.

According to the embodiment, the operation information intended by a user is inputted via the input unit, and with the inputted operation information, the charge-discharge control is performed. Thus, it is possible to achieve the charge-discharge control according to the user's intention.

In another embodiment of the present invention, the plurality of loads for different purposes includes a travel load for traveling the movable object and a work load for performing an operation other than traveling the movable object. The travel load and the work load, in particular, may be independently drivable, such as a garbage truck and a high-lift work vehicle.

According to the another embodiment, with application of the present invention to the movable object including the travel load and the work load as the load unit, it is possible to perform flexible charge-discharge control in the movable object whose travel load and the work load are independently drivable, such as a transport truck for patrolling distribution stations and lifting and lowering a loading platform to load a cargo and a high-lift work vehicle for patrolling areas to check electric cables and lifting and lowering a platform to a high work floor for line maintenance.

In yet another embodiment of the present invention, the plurality of secondary cells is lithium-ion cells.

According to yet another embodiment, the flexible charge-discharge control can be achieved. Therefore, even in the case where the battery packs installed in the battery system of the present invention are lithium-ion secondary cells having a concern of reduced battery life when repeatedly overcharged or overdischarged, it is possible to achieve enhanced life of the battery packs.

To solve the above problem, the present invention provides a method of controlling a battery system for a movable object on which the battery system is mounted and which comprises a charger and a load unit including a plurality of loads electrically driven for different purposes, the battery system comprising a plurality of battery packs formed by connecting a plurality of secondary cells in series or in parallel and a power control circuit for changing a connection state between each of the plurality of battery packs and the charger and a connection state between each of the plurality of battery packs and the load unit. The method of controlling the battery system for the movable object comprises the steps of:

estimating a power consumption pattern in an operation cycle based on operation information about operating patterns of each of the plurality of loads during an operation cycle of the movable object; and controlling switching of the power control circuit so as to cover power consumption of the load unit in accordance with the estimated power consumption pattern.

According to the method of controlling the battery system for the movable object, it is possible to attain the above battery system for the movable object, which includes each of the above embodiments.

To solve the above problem, an industrial vehicle according to an embodiment of the present invention comprises the battery system for the movable object described above (including each of the above embodiments). As an industrial vehicle, there are a wide variety of movable objects having a plurality loads electrically driven for different purposes, such as an automobile, a ship and an airplane. More specifically, the industrial vehicle may include a transport truck for patrolling distribution stations and lifting and lowering a loading platform to load a cargo and a high-lift work vehicle for patrolling areas to check electric cables and lifting and lowering a platform to a high work floor for line maintenance.

Advantageous Effects

According to the present invention, by controlling the power control circuit based on the operation information, it is possible to change the connection state between the plurality of battery packs and the charger as well as the connection state between the plurality of battery packs and the load unit. In this manner, depending on the operation pattern of each of the loads in the operation cycle of the movable object, it is possible to charge at least one battery pack selected from the plurality of battery packs by connecting the at least one battery pack to the charger, and also to discharge electric power from the remaining battery packs to the load unit. As a result, it is possible to control charge and discharge of the battery packs efficiently and flexibly in accordance with the power consumption pattern estimated from the operation information, and it is particularly possible to perform charge or discharge of the battery packs respectively and concurrently.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

In a present embodiment, a battery system according to the present invention is applied to a garbage truck which is one example of a movable object with the battery system mounted thereon. However, this is not limitative and the battery system can be widely applied to movable objects having a load unit including a plurality of loads that are electrically driven for different purposes, such as an automobile, a ship and an airplane. The battery system is applicable to a movable object having independently-drivable travel load and work load, such as a transport truck for driving around distribution stations and lifting and lowering a loading platform to load a cargo and a high-lift work vehicle for driving around areas to check electric cables and lifting and lowering a platform to a high work floor for line maintenance.

Figure 1:
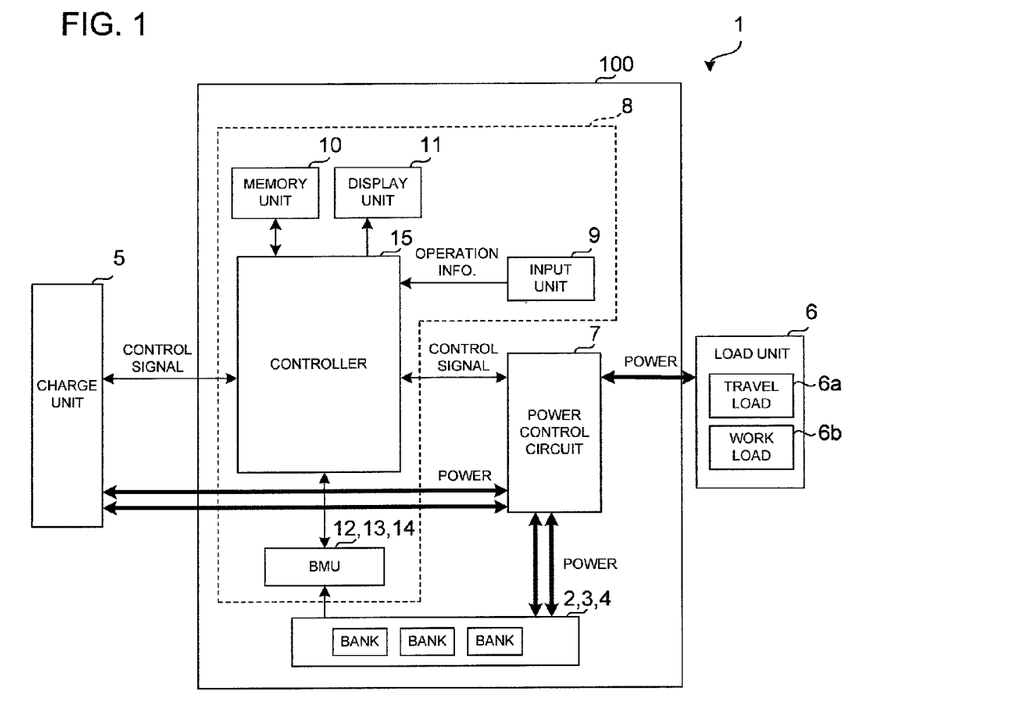
FIG. 1 is a block diagram showing a general structure of a garbage truck.

FIG. 1 is a block diagram showing a general structure of the garbage truck 1. The garbage truck 1 includes a battery system 100 according to the present invention, a charge unit 5 for charging banks 2, 3, 4 by connecting them to an external commercial power source (not shown), and a load unit 6 driven by electric power discharged from the banks 2, 3, 4. Further, the battery system 100 is provided with a plurality of battery packs (hereinafter referred to as "banks 2, 3, 4"), a power control circuit 7 for changing a connection state between the banks 2, 3, 4 and the charge unit 5 as well as a connection state between the banks 2, 3, 4 and the load unit 6, and a control system 8 for controlling these operations.

The banks 2, 3, 4 are battery packs formed of a plurality of secondary cells. As the secondary cells, any secondary cells including lithium-ion secondary cells or lead cells may be used. In this embodiment, fast-charge lithium-ion cells are used to constitute the bank 2, 3, 4. In this embodiment, three banks 2, 3, 4 are installed in the garbage truck 1. However, the number of the banks is not limited to three.

The charge unit 5 receives AC power (typically 100V or 200V) from the external commercial power source (not shown), rectifies and smoothes the supplied AC power into DC power, and then converts it into output voltage appropriate for charging the banks 2, 3, 4. For instance, the charge unit 5 is provided with a charge cable connectable to the commercial power source arranged at a stationary place. By connecting the charge cable to the commercial power source while the garbage truck 1 is parked, the banks 2, 3, 4 are charged.

The load unit 6 is driven by using electric power discharged from the banks 2, 3, 4. In this embodiment, the load unit 6 is formed by a travel load 6a and a work load 6b. The travel load 6a is for traveling the garbage truck 1. For instance, the travel load 6a is formed by an electric motor rotated and powered by the power discharged from the banks 2, 3, 4, and wheels for transmitting the drive force of the electric motor to a road surface. The work load 6b is for performing operations other than traveling the garbage truck 1. For instance, the work load 6b is a mechanism drivable by electric motors, such as a compacting mechanism driven when compacting the collected garbage and placing it in a box-shaped container provided in the garbage truck 1 when the garbage truck 1 is parked and a discarding mechanism driven when discarding the compacted garbage stored in the box-shaped container. In addition to this, a variety of loads driven for purposes other than traveling the garbage truck 1 may be used as the work load 6b. For instance, an air conditioner is one of them.

The power control circuit 7 is configured to be able to appropriately change the connection between the banks 2, 3, 4 and each of the charge unit 5 and the load unit 6 so as to be able to supply electric power from the charge unit 5 to the banks 2, 3, 4 upon charging and supply electric power from the battery banks 2, 3, 4 to the load unit 6 upon discharging based on the control signal from the control system 8. Further, a configuration of the power control circuit 7 is described later in details.

The control system 8 is provided with an input unit 9 for a user to input the operation information, a memory unit 10 for storing the inputted operation information, a display unit 11 for displaying the operation information, a BMU (in this embodiment, the BMUs are provided for the banks 2, 3, 4 respectively and are referred to as BMUs 12, 13, 14) for obtaining charge-discharge information (e.g. the charge level, a cell voltage, its temperature and the like) from the banks 2, 3, 4, and a controller 15 for controlling the charge unit 5 and the power control circuit 7 by supplying and receiving control signals based on the operation information readout from the memory unit 10 and the charge-discharge information readout from the BMUs 12, 13, 14. Further, the controller 15 functions as one example of the "controller" according to the present invention.

The input unit 9 is an interface for a user to input the operation information. More specifically, there are a variety of pointing devices as a form of the input unit 9, such as a keyboard, a touch pen, a mouse, a trackball, a touch pad or a scroll button. Further, as another form of the input unit, there is a drive capable of reading a memory medium storing the operation information, such as a magnetic disk, a CD, a DVD and a Blu-ray disk. Furthermore, the input unit 9 is an example of the "input unit" according to the present invention.

The memory unit 10 may take a variety of forms including rewritable forms such as a RAM (Random Access Memory), flash memory, USB memory, HDD (Hard Disk Drive) and a buffer memory, or non-rewritable forms such as ROM (Read Only Memory). The operation information stored in the memory unit 10 is appropriately readout by the controller 15 and used for calculations. Further, the memory unit 10 is an example of the "memory" according to the present invention.

The display unit 11 is a device capable of displaying the operation information stored in the memory unit 10. For instance, the display unit 11 may take a variety of forms such as a plasma display unit, a LCD unit or a CRT display unit. With the operation information displayed in the display unit 11, the user can visually acknowledge based on what type of operation information the operation control of the garbage truck 1 is performed. By displaying additional information about the operating state of the garbage truck 1, about charge/discharge of the banks 2, 3, 4 obtained from the BMUs 12, 13, 14 along with the operation information, it becomes user-friendlier.

Figure 2:
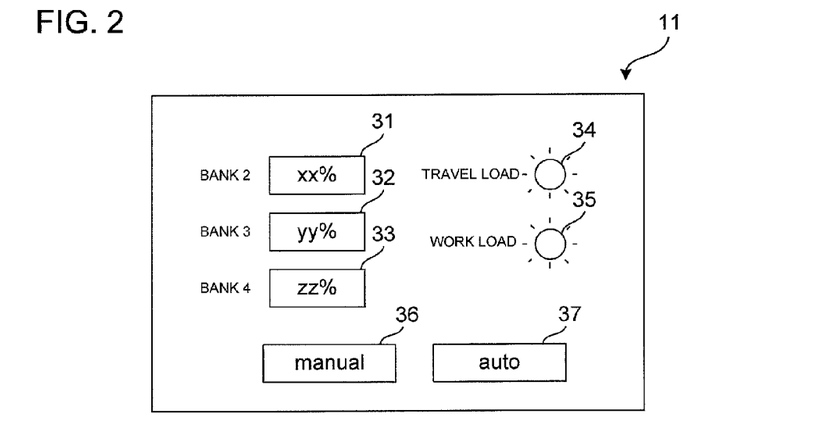
FIG. 2 is a schematic view of a display example of a display unit.

FIG. 2 is a schematic view of a display example of the display unit 11. In this display example, the monitor of the screen of the display unit is formed as a touch panel so as to function as the input unit 9 as well. More specifically, shown on the screen are charge level display parts 31, 32, 33 for displaying charge levels of the banks 2, 3, 4, indicators 34, 35 for informing the user of drive state of the travel load 6a and the work load 6b of the load unit 6 respectively by lighting up, and touch-panel type icons 36, 37 for selecting a manual control or an automatic control of the battery system 100. The automatic control herein is to automatically perform the charge-discharge control of the bank 2, 3, 4 based on the operation information described below. The manual control herein indicates, for instance, to manually perform the charge-discharge control of the battery system when it becomes necessary for the user to perform the charge-discharge control different from the operation information of the garbage truck 1 (e.g. during emergency). The manual control may be performed by directly inputting intended charge levels of the banks 2, 3, 4 by the user to the charge level display parts 31, 32, 33 via the input unit 9 such as a keyboard so as to discharge electric power of the inputted charge level from the banks 2, 3, 4. The possible occasions when the manual control is necessary, may include an occasion when it becomes necessary for the garbage truck 1 to use an amount of electric power departing from the operating information, such as when the collected garbage abruptly increases temporarily.

Referring to FIG. 1 again, the BMUs 12, 13, 14 are units each having a function to obtain and store the charge-discharge information of the tank 2, 3, 4. The charge-discharge information includes, for instance, specific information of the batteries such as rated capacity, temperature characteristics and storage characteristics of the banks 2,3,4 as well as information regarding charge and discharge of the batteries such as a charge level, a discharge level, the number of charges. The charge-discharge information obtained and stored in BMUs 12, 13, 14 is then appropriately readout by the controller 15 to be used for calculations. The charge-discharge information may be obtained from the banks 2, 3, 4, and stored in the BMUs 12, 13, 14 at regular or irregular intervals. The BMUs 12, 13, 14 are one example of the "charge level obtaining unit" according to the present invention.

The controller 15 sends and receives control signals to and from the charge unit 5 and the power control circuit 7 based on the operation information readout from the memory unit 10 and the charge-discharge information readout from the BMUs 12, 13, 14. By this, the charge unit 5 and the power control circuit 7 are controlled and the charge-discharge control of the banks 2, 3, 4 is performed. Further, the control performed by the controller 15 is described later in details.

Referring to FIG. 3, a detailed configuration of the power control circuit 7 is explained. FIG. 3 is a block diagram showing a circuit configuration of the power control circuit 7. The same reference numerals are given without adding explanations for those configurations that are the same as the structure shown in FIG. 1.

Figure 3A:
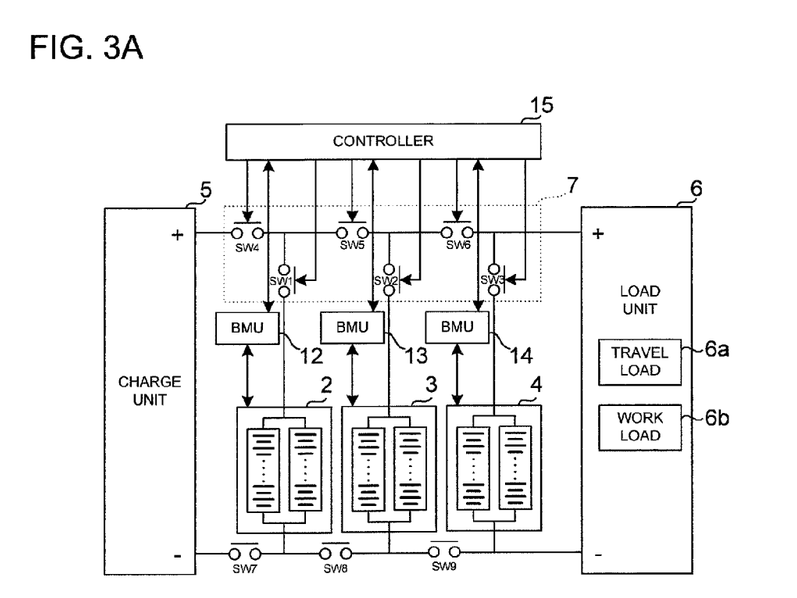
FIG. 3 is a block diagram showing a circuit configuration of a power control circuit.

As shown in FIG. 3A, the power control circuit 7 is configured such that switches SW1 through SW6 are electrically connected to each other by wire. The switches SW1, SW2, SW3 are electrically connected to positive electrodes of the banks 2, 3, 4 at one end and to the switches SW4 SW5, SW6 at the other end. The switch SW4 is electrically connected to a positive electrode of the charge unit 5 while the switch SW6 is electrically connected to a positive electrode of the load unit 6 at the other end. The switches SW7, SW8, SW9 are electrically connected to negative electrodes of the banks 2, 3, 4. The switches SW7, SW9 in particular are connected to negative electrodes of the charge unit 5 and the load unit 6 at one end thereof, respectively. The switches are operable in pairs, i.e. SW4 and SW7, SW5 and SW8, SW6 and SW9 so as to switch a connection state between each of the banks 2, 3, 4 and each of the charge unit 5 and the load unit 6.

The positive terminals of the banks 2, 3, 4 are connected to the switches SW1, SW2, SW3 while the negative terminals of the banks 2, 3, 4, are short-circuited with the charge unit 5 and the load unit 6 with respect to each other. The switches SW1 through SW6 constituting the power control circuit 7 are switchable between ON and OFF according to the control signals from the controller 15. In this manner, by switching on and off the switches SW1 through Sw6 in accordance with the control signals from the controller 15, the power control circuit 7 is configured so as to independently control charging of each of the banks 2, 3, 4 from the charge unit 5, or discharging of each of the banks 2, 3, 4 to the load unit 6.

Figure 3B:
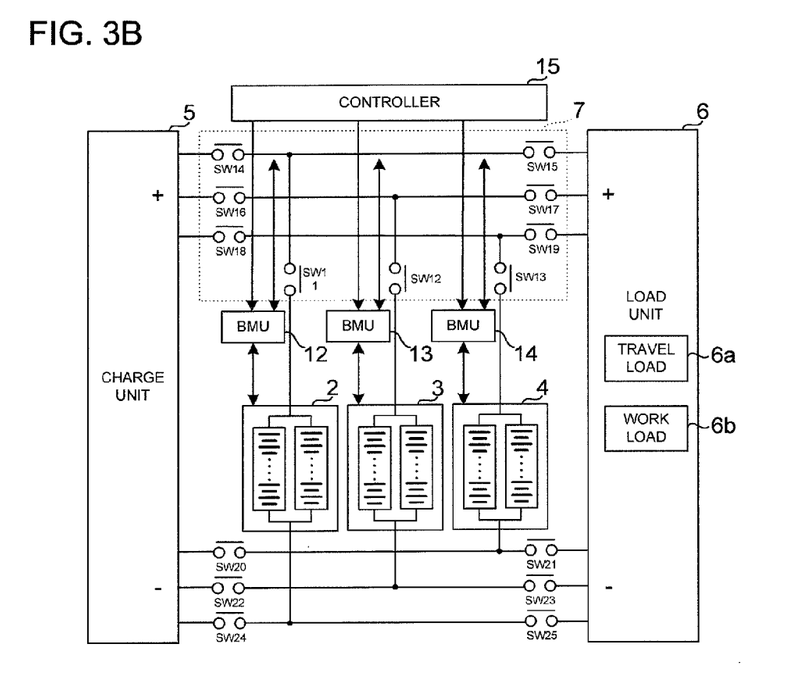

As the configuration of the power control circuit 7, the circuit shown in FIG. 3B may be used. In the example shown in FIG. 3B, switches SW11 through SW25 are switched ON and OFF in accordance with the control signals from the controller 15. With this configuration, it is possible to flexibly switch between the charge unit 5 or the load unit 6 to which the banks 2, 3, 4 are connected, compared to the case of FIG. 3A. In FIG. 3B, lines of sending control signals from the controller 15 to the switches SW11 through SW25 are not shown in the drawing for easier understanding of the configuration of the power control circuit 7. In a manner similar to FIG. 3A, the control signals are sent from the controller 15 to each of the switches SW11 through SW25 so as to switch ON/OFF of each of the switches.

As shown in FIG. 3A and FIG. 3B, the BMUs 12, 13, 14 obtain and store the charge-discharge information of the banks 2, 3, 4, respectively and the controller 15 accesses the BMU 12, 13, 14 to readout the charge-discharge information stored in the BMUs 12, 13, 14.

Figure 4:
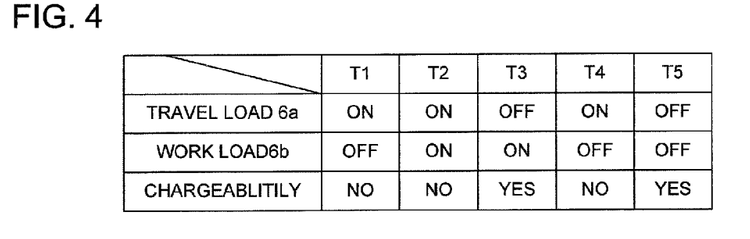
FIG. 4 is an illustration of operation information stored in a memory unit.

Next, operation patters of the load unit 6 defined by the operation information stored in the memory unit 10, are explained in reference to FIG. 4. FIG. 4 is an illustration of operation patters of the load unit 6 defined by the operation information stored in a memory unit 10. In the exemplary case shown in FIG. 4, an operation cycle of the garbage truck 1 is one day. The operation cycle is divided into periods (T1 to T5) according to change of the drive state of the travel load 6a and the work load 6b, and the drive state of the travel load 6a and the work load 6b in each period and chargeability from the external commercial power source are defined.

The period T1 is defined as a period in which only the travel load 6a is driven (i.e. the work load 6b is not driven) and the charge cannot be performed from the external commercial power source. More specifically, the period T1 is a travel period in which the garbage truck 1 travels from a storage station to a site where the garbage is collected. In the period T1, the garbage truck 1 is in a traveling state and thus the charge unit 5 cannot be connected to the commercial power source arranged at a stationary place. Thus, the banks 2, 3, 4 are not chargeable.

The period T2 is defined as a period in which the travel load 6a and the work load 6b are driven and the charge cannot be performed from the external commercial power source. More specifically, the period T2 is a garbage-collection period in which the garbage truck 1 arrives at the site to collect garbage and performs collection of garbage repeatedly while driving around for garbage collection points scattered around the site. In the period T2, the garbage truck 1 is in the traveling state and thus the charge unit 5 cannot be connected to the commercial power source arranged at a stationary place. Thus, the banks 2, 3, 4 are not chargeable.

The period T3 is defined as a period in which only the work load 6b is driven (i.e. the travel load 6a is not driven) and the charge can be performed from the external commercial power source. More specifically, the period T3 is a discarding period in which, after completing the garbage collection in the period T2, the garbage truck 1 is parked at a garbage disposal facility and the compacted garbage stored in the box-shaped container of the garbage truck 1 is discharged from the garbage truck 1 by driving the work load 6b. In the period T3, the commercial power source for charging is provided at the stationary site in the garbage disposal facility where the garbage truck 1 is parked and the bank can be charged by connecting the charge unit 5 to the commercial power source.

The period T4 is defined, in the same manner as the period T1, as a period in which only the travel load 6a is driven (i.e. the work load 6b is not driven) and the charge cannot be performed from the external commercial power source. More specifically, the period T4 is a returning period in which the garbage truck 1 having completed the disposal of the collected garbage at the garbage disposal facility travels to the storage station of the garbage truck 1.

The period T5 is defined as a period in which neither of the travel load 6a and the work load 6b is driven and the charge can be performed from the external commercial power source. More specifically, the period T5 is a storage period in which the garbage truck 1 having returned to the storage station is kept in the storage station (e.g. nighttime). In the period T5, the commercial power source for charging is provided at the stationary site in the storage station where the garbage truck 1 is parked and the bank can be charged by connecting the charge unit 5 to the commercial power source.

The controller estimates a power consumption patter in the operation cycle based on the operation pattern of the load unit 6 defined by the operation information described above. In the embodiment, the memory unit 10 stores beforehand as data the amount of power consumption when the travel load 6a and the work load 6b are driven for a prescribed period of time. The controller 15 accesses the memory unit 10 to readout the data and estimates the power consumption of each period. The amount of power consumption stored in the memory unit 10 may be calculated based on past operation records of the garbage truck 1 (e.g. actual measured amount of power consumption when the travel load 6a and the work load 6b were driven in the past).

Figure 5:
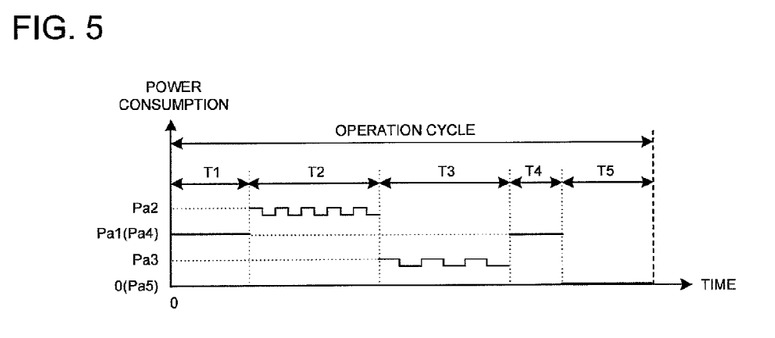
FIG. 5 is a graph showing estimated power consumption during each period, which is estimated based on the operation information.

FIG. 5 is a graph showing the power consumption pattern estimated by the controller 15 based on the operation information of FIG. 4. FIG. 5 shows time on a horizontal axis and the estimated power consumption on a vertical axis (hereinafter referred to as "estimated power consumption" where appropriate).

The estimated power consumption P1 of the period T1 is the estimated power consumption by the travel load 6a driven in the period T1. The estimated power consumption P2 of the period T2 is the estimated power consumption by the travel load 6a and the work load 6b driven in the period T2. The estimated power consumption P2 is greater than the estimated power consumption P1 for the corresponding amount of additional driving the work load 6B. Further, in the period T2, the garbage truck 1 switches its operation between the travel operation and the garbage-collection operation, and thus the estimated power consumption P2 changes depending on the timing of switching the operation. The estimated power consumption P3 of the period T3 is the estimated power consumption by the work load 6b driven in the period T3. The estimated power consumption P3 is smaller than the estimated power consumption P2, as the power is not consumed for driving the travel load 6a. Further, in the period T2, the garbage truck 1 switches its operation between the travel operation and the garbage-collection operation, and thus the estimated power consumption P2 changes according to the timing of switching its operation. Further, the work load 6b driven in the period T3 switches its operation between a drive state and a stop state depending on a garbage-discarding situation and thus, the estimated power consumption P3 changes depending on the timing of switching the operation. The estimated power consumption P4 of the period T4 is estimated power consumption by the travel load 6a driven in the period T4. The estimated power consumption P5 of the period T5 is zero as there is no power consumption by the load unit 5 in the period T5.

Figure 6:
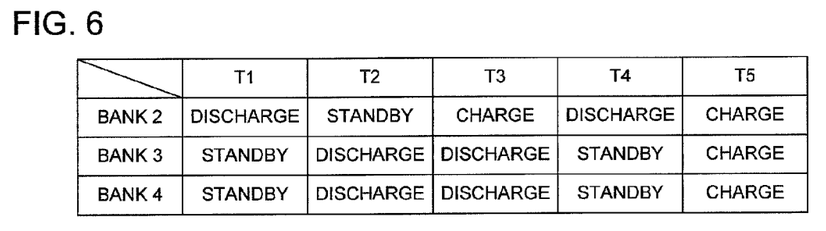
FIG. 6 is a table showing a state of each bank for each period.
Figure 7:
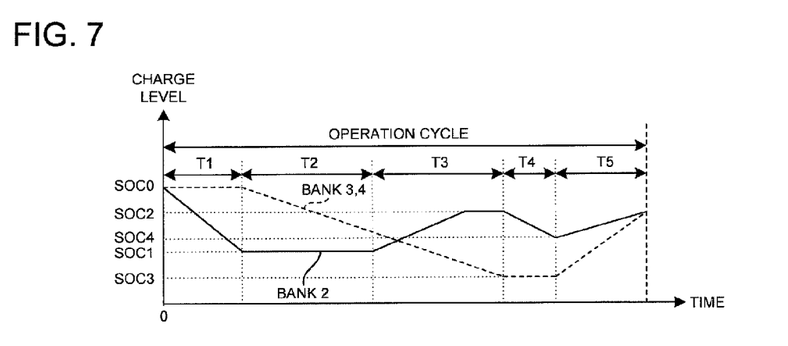
FIG. 7 is a graph showing transition of the charge level of each bank.

The controller 15 sets the states of the banks 2, 3, 4 as "charge", "discharge" or "standby" for each period so as to cover the estimated power consumption of each period shown in FIG. 5 with the electric power discharged from the banks 2, 3, 4. An example of this type for controlling the states of the banks 2, 3, 4 for each period is shown in FIG. 6 and FIG. 7. FIG. 6 is a table showing a state of each bank for each period. FIG. 7 is a graph showing transition of the charge level of each bank when the state of the bank is controlled as shown in FIG. 6.

In the period T1, the state of the bank 2 is set as "discharge" and the states of the banks 3, 4 are set as "standby" as the estimated power consumption P1 is relatively small and can be covered by discharging electric power from the bank 2 alone. In other words, instead of performing inefficient charge-discharge control, i.e. discharging all of the banks 2, 3, 4 to cover the small estimated power consumption P1. The state of each bank is set so that the bank 2 alone is discharged to achieve a total volume of a bank contributing to the discharge to be closest to the estimated power consumption P1. Further, the banks 2, 3, 4 are not chargeable in the period T1 as shown in FIG. 4. Thus the states of the banks 3, 4 are set as "standby" instead of "charge". By setting the state of each bank in the period T1 in this manner, the charge levels of the banks 3, 4 are maintained whereas the charge level of the bank 2 decreases.

In the period T1, the bank 2 is selected among the banks 2, 3, 4 to supply electric power to cover the estimated power consumption P1. This is not limitative and the bank 3 or 4 may be selected instead of the bank 2. Particularly, when the operation cycles are repeated, if a certain bank is frequently discharged, this may cause variations in the battery lives of the banks. To prevent the variations of the battery lives, it is preferable to perform such control as to change a bank to be selected randomly.

In the period T2, the state of the bank 2 is set as "standby" and the states of the banks 3, 4 are set as "discharge". In the period T2, the banks 3, 4 with high charge level compared to the bank 2 are discharged to cover the estimated power consumption P2. The estimated power consumption P2 is greater than the estimated power consumption P1. Even when the estimated power consumption P2 is too great to be covered by one bank, the situation can be handled by discharging two banks as described above. Further, the banks 2, 3, 4 are not chargeable in the period T2 as shown in FIG. 4. Thus the state of the bank 2 is set as "standby" instead of "charge". By setting the state of each bank in the period T2 in this manner, the charge level of the bank 2 is maintained whereas the charge levels of the banks 3, 4 decrease.

In the period T3, the state of the bank 2 is set as "charge" and the states of the banks 3, 4 are set as "discharge". In the beginning of T3, the charge level of the bank 2 is lower than those of the banks 3, 4. Thus, the banks 3, 4 with comparatively high charge level are discharged and the bank 2 with lower charge level is preferentially charged so as to recover the low charge level. By setting the state of each bank in the period T3 in this manner, the charge level of the bank 2 increases whereas the charge levels of the banks 3, 4 decrease.

Herein, the banks 3, 4 are discharged at the same time as charging the bank 2 in the period T3 so as to improve the efficiency of the charge-discharge control. For instance, in the following periods, if the charge levels of the banks 3, 4, that are currently discharged (in the period T3) become low, it is possible to cover the power consumption by discharging the bank 2 having recovered the charge level in the period T3.

Further, once the charge level of the bank 2 having been charged in the period T3 reaches a level SOC2, the charge unit 5 stops charging to prevent overcharge of the bank 2. Then, the state of the bank 2 is transferred automatically to "standby". As a result, it is possible to prevent overcharge of the bank 2 and to enhance the life of the bank 2.

In the period T4 in the same manner as the period T1, the state of the bank 2 is set as "discharge" and the states of the banks 3, 4 are set as "standby". By setting the state of each bank in the period T4 in this manner, the charge levels of the banks 3, 4 are maintained whereas the charge level of the bank 2 decreases.

In the period T5, the states of the banks 2, 3, 4 are set as "charge". As the estimated power consumption P5 is zero, there is no need to discharge the banks 2, 3, 4. Further, in the period T5, the banks 2, 3, 4 can be charged by connecting the charge unit 5 to the commercial power source provided in the storage station. In the period T5 being the final period of the operation cycle, the banks 2, 3, 4 are sufficiently charged within a range that does not cause overcharge thereof to prepare for the next operation cycle (i.e. an operation of the following day). By setting the state of each bank in the period T5 in this manner, the charge levels of the banks 2, 3, 4 increase.

Figure 8:
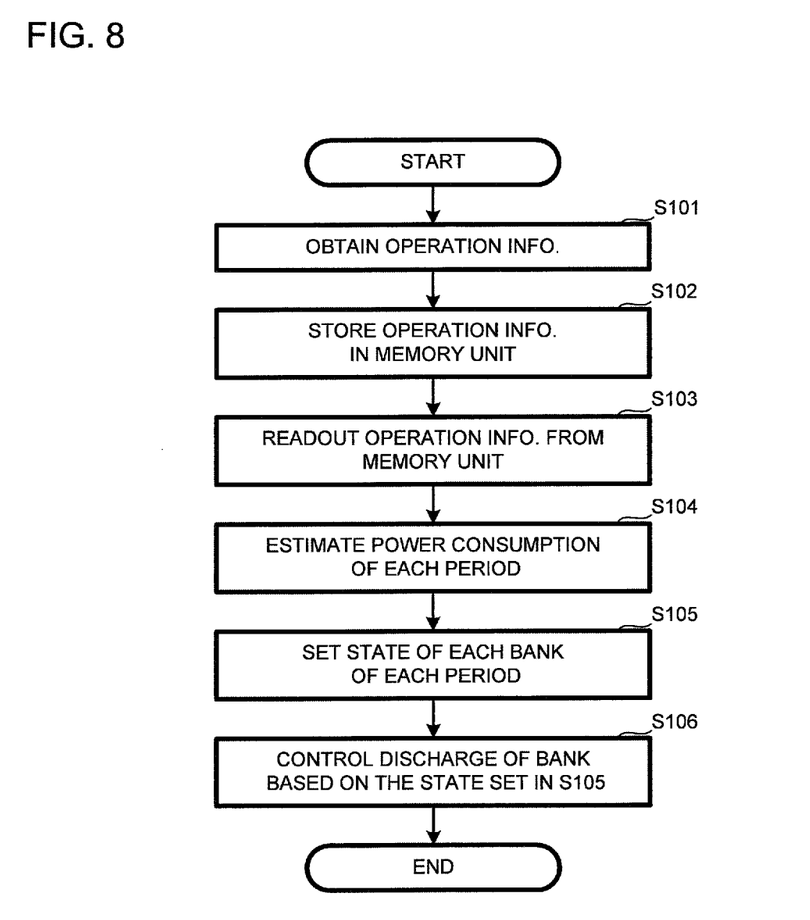
FIG. 8 is a flow chart showing an overall process performed by a controller.

Described referring to FIG. 8 is a process performed by the controller 15 for controlling the state setting of the banks 2, 3, 4 in each period described above. FIG. 8 is a flow chart showing a process performed by the controller 15 to control the state setting of the banks 2, 3, 4 in each period.

First, the controller 15 obtains the operation information inputted via the input unit 9 (a step S101), and then stores the obtained information 10 in the memory unit 10 (a step S102). The operation information may be inputted by a user for instance on a regular basis in conformity with the operation cycle. In this embodiment, the operation cycle of the garbage truck 1 is "one day". When the operation hour ends that day (e.g. after the garbage truck 1 completes the task of that day and returns to the storage station), the operation information correspond to the following operation day may be inputted. Further, the duration of the operation cycle of the garbage truck 1 may be set to one day, one week, one month or the like.

Next, the controller 15 accesses the memory unit 10 to readout the operation information stored in the memory unit 10 (a step S103) and then estimates the estimated power consumption of each period of the operation cycle based on the operation information (a step S104). In this step, the controller 15 functions as the "estimation unit" according to the present invention. Further, in such a case that the power consumption of each period is specified in the operation information itself, the specified power consumption may be used as the estimated power consumption. In this case, the step S104 may be skipped.

To cover the estimated power consumption estimated in the step S104, the controller 15 sets the states of the banks 2, 3, 4 as "charge", "discharge" or "standby" (a step S105). Then, the power control circuit 7 is switched to control the charge-discharge state of the banks 2, 3, 4 (a step S106) so as to achieve the state of the banks 2, 3, 4 having been set in the step S105.

Figure 9:
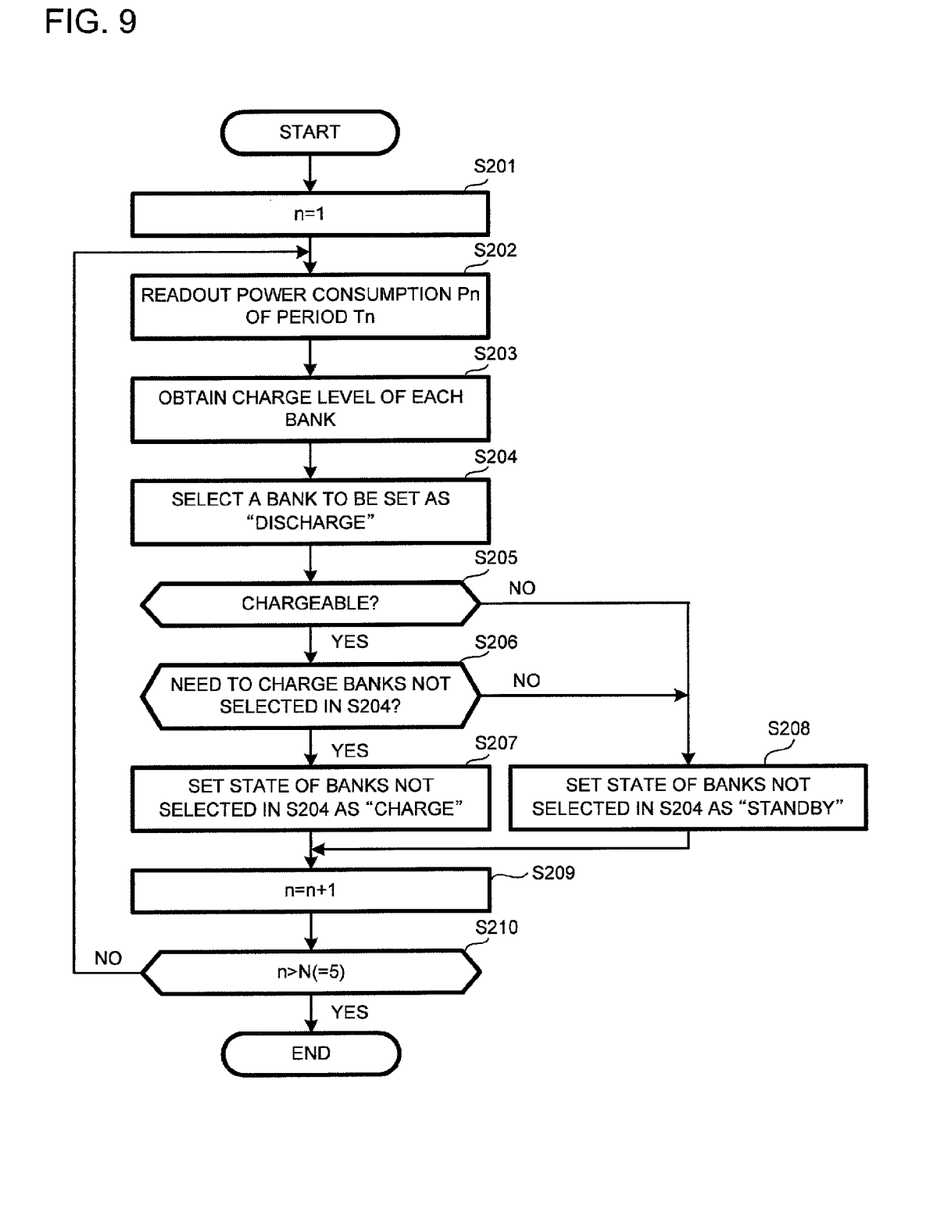
FIG. 9 is a flow chart showing a state setting control process for each bank, which is performed in FIG. 8.

Described in reference to FIG. 9 is a process performed in the step S105 for controlling the state setting of each bank. FIG. 9 is a flow chart showing a process of controlling the state setting of each bank, which is performed in the step S105 of FIG. 8. In this process, an increment variable n is used corresponding to each of the periods T1 to T5 of the operation cycle and by counting the increment variable n, the control is performed to set the states of the banks 2, 3, 4 in each period sequentially.

To set the states of the banks 2, 3, 4 in the period T1, "1" is substituted for the increment variable n (a step S201). Next, the controller 15 readouts the estimated power consumption P1 estimated in the step S104 for the period T1 (a step S202).

The controller accesses the BMUs 12, 13, 14 to obtain the charge levels of the banks 2, 3, 4 (a step S203). Then, based on the obtained charge levels of the banks 2, 3, 4, a bank whose state is to be set as "discharge" is selected (a step S204) to cover the estimated power consumption P1 having been readout in the step S202.

According to the operation information shown in FIG. 4, the estimated power consumption P1 of the period T1 is relatively small. Thus, the bank 2 is selected as the bank whose state is set as "discharge". In other words, the bank 2 alone is selected and discharged instead of performing inefficient charge-discharge control, i.e. discharging all of the banks 2, 3, 4 to cover the small estimated power consumption P1.

Next, the controller 15 determines whether or not the banks 2, 3, 4 are chargeable by connecting the charge unit 5 to the commercial power source in the period T1 (a step S205). More specifically, by referring to the chargeability specified in the operation information as shown in FIG. 4, the chargeability is determined. As show in FIG. 4, the controller 15 determines it is not chargeable in the period T1.

In the process shown in FIG. 9, if it is determined chargeable (YES in the step S205), the controller 15 determines whether the banks having not been selected in the step S204 (i.e. the banks 3, 4) need to be charged (a step S206). The step S206 is performed by determining whether the charge levels of the banks 3, 4 obtained from the BMUs are not greater than a prescribed charge-level threshold that requires charging (e.g. a threshold equivalent of a charge level of overcharge). As a result, if it is determined the banks need to be charged (YES in the step S206), the states of such banks in the period T1 is set as "charge" (a step S207).

In contrast, if it is determined not chargeable (NO in the step S205) or if it is determined that charging is not needed (NO in the step S206), the states of the banks 3, 4 in the period T1 are set as "standby" (a step S208).

Once the states of the banks 2, 3, 4 in the period T1 are set, the increment variable is incremented by one (a step S209) and the process transits to setting the states of the banks 2, 3, 4 in the period T2 (NO in a step S210). The states of the banks 2, 3, 4 in the following periods T2 to T5, can be respectively set by repeating the above steps S202 to S207.

The state setting of the banks 2, 3, 4 in the period T2 is performed as follows. As the estimated power consumption P2 is greater than the estimated power consumption P1, and as the charge level of the bank 2 is low from being discharged in the period T1, the states of the banks 3, 4 are set as "discharge" (the step S204). In contrast, the state of the bank 2 is set as "standby" (the step S208) as it is not chargeable in the period T2 (NO in the step S205).

Next, the state setting of the banks 2, 3, 4 in the period T3 is performed as follows. As the charge levels of the banks 3, 4 are higher than that of the bank 2, the states of the banks 3, 4 are set as "discharge" (the step S204). In contrast, the state of the bank 2 is set as "charge" (the step S207) as the charge level of the bank 2 is low (YES in the step S206) and it is chargeable in the period T3 (YES in the step S205).

In the period T4, as the estimated power consumption P4 is substantially the same as the estimated power consumption P1 of the period T1, the state of the bank 2 is set as "discharge" and the states of the banks 3, 4 are set as "standby".

In the period T5, as the estimated power consumption P5 is zero, the state of none of the banks 2, 3, 4 is set as "discharge". Instead, the states of the banks 2, 3, 4 are set as "charge" (the step S207) as it is chargeable in the period T5 (YES in the step S205) and the charge levels of the banks 2, 3, 4 are low (YES in the step S206).

Once the state setting of the banks 2, 3, 4 for each period is completed (YES in the step S210), the controller 15 ends a set of processes (END).

Figure 10:
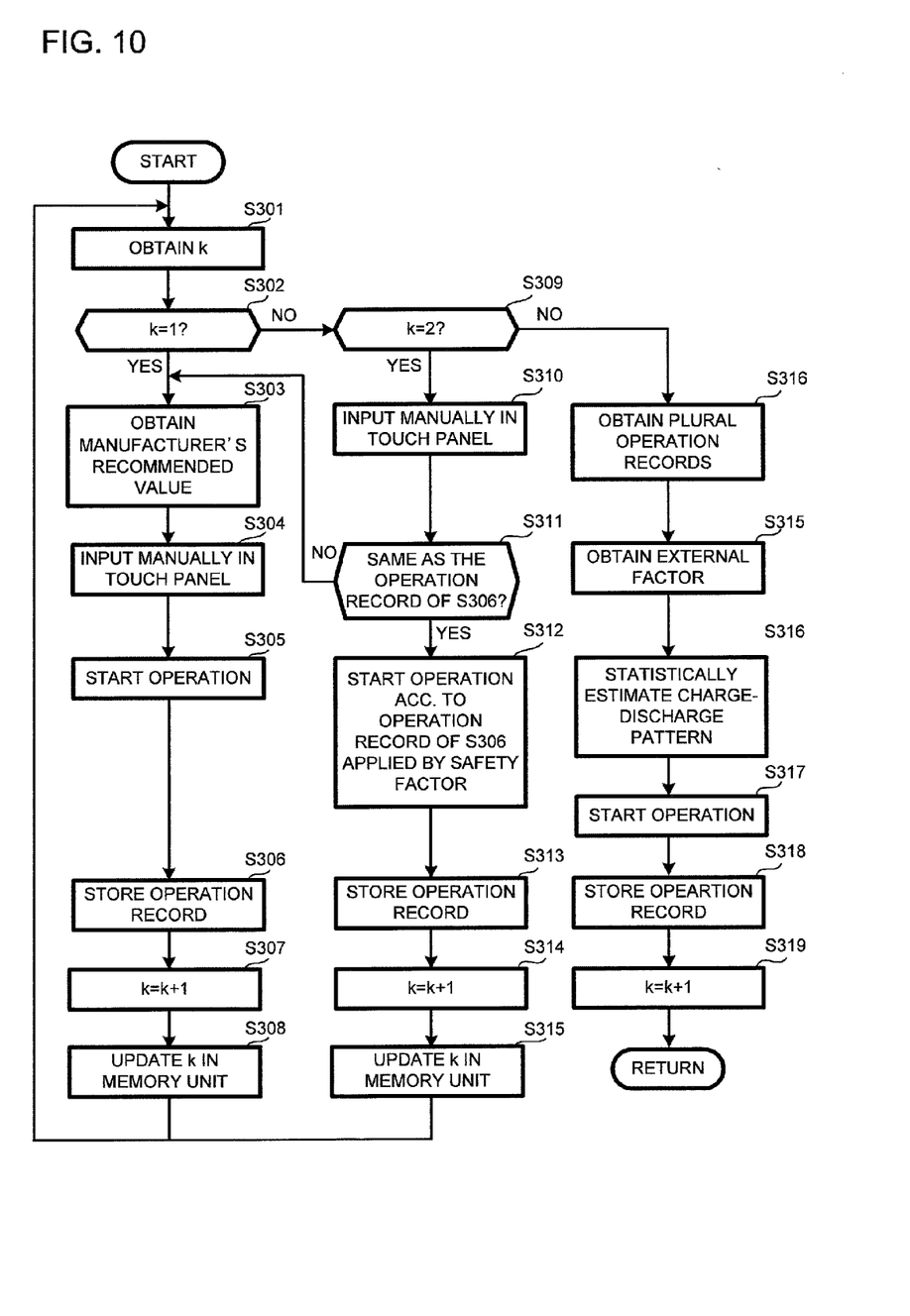
FIG. 10 is a flow chart showing an example of a flow of estimating a power consumption pattern based on past operation records stored in the memory unit.

An exemplary flow of estimating the power consumption pattern based on the past operation record stored in the memory unit 10 is described in reference to FIG. 10. The past operation record is, for instance, the record stored in the memory unit 10 by associating the operating state of the travel load 6a and the work load 6b in each period (T1 to T5) when using the garbage truck 1 (see FIG. 4 for details), with the transition of the power consumption in each period (see FIG. 7 for details). In this process, an increment variable k is used corresponding the past operation times of the garbage truck 1 and the increment variable k is counted. When the increment variable k is 3 or above (i.e. a plurality of past operation records is stored in the memory unit 10), the power consumption pattern is estimated statistically.

First, the controller obtains the increment variable k from the memory unit 10 (a step S301), and determines whether the obtained increment variable k is "1" (a step S302). More specifically, it is determined in this step whether the past operation record is stored in the memory unit 10. If the increment variable k is "1" (YES in the step S302), the controller 15 obtains manufacturer's recommended values of the banks 2, 3, 4 (e.g. a voltage range, maximum discharge current, maximum charge current, an operating temperature range and the like) (a step S303). Herein, the manufacturer's recommended values are stored in the memory unit 10 in advance and are obtainable by the controller 15 accessing the memory unit 10.

Figure 11:
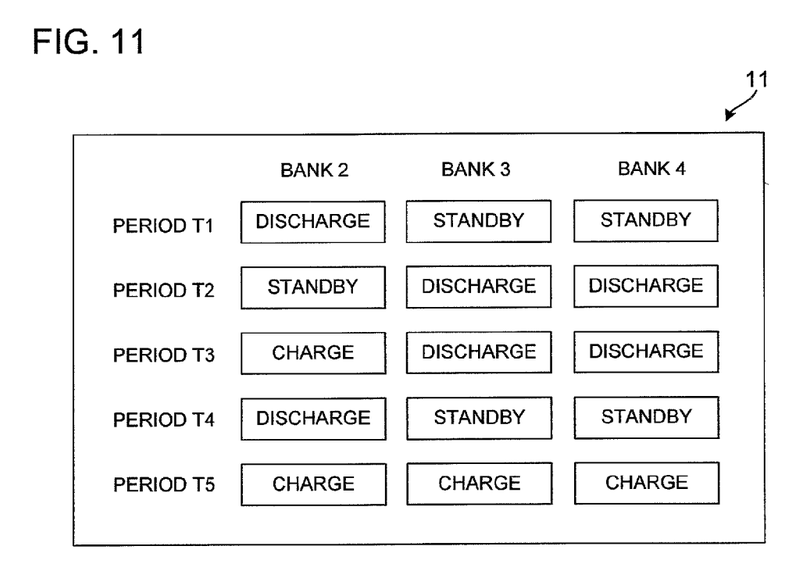
FIG. 11 is a schematic view of a touch panel image displayed on the display unit when performing the process shown in FIG. 10.

Next, the user enters which one of the banks 2, 3, 4 is discharge or charged in each period of the operation cycle (i.e. the periods T1 to T5) via the touch panel displaced in the display unit 11 (a step S304). FIG. 11 shows one example of the touch panel displayed in the display unit 11 for entering the setting. As shown in FIG. 11, icons are provided in the touch panel so as to be able to select a state of each of the banks 2, 3, 4 as "charge", "discharge" or "standby" for each period. The touch panel is configured so that a state of the bank 2, 3, 4 for each period can be entered by the user touching the icon.

In the step S305, in accordance with the content entered via the touch panel in the above manner, the garbage truck 1 starts its operation (the step S305). As a result, the power consumption pattern of the bank 2, 3, 4 for each period (i.e. the period T1 to T5) can be obtained and the obtained power consumption pattern is stored in the memory unit 10 as the past operation record by associating it with the content entered from the touch panel (a step S306). After storing the past operation record in the memory unit 10 in this manner, the controller 15 adds "1" to the increment variable k and stores it in the memory unit 10 to update the increment variable k (steps S307 and S308). Then the process returns to the step S301 to transit to a process described below.

If the increment variable k obtained in the step S301 is not "1" (NO in the step S302), the controller 15 further determines whether the increment variable is "2" (a step S309). More specifically, it is determined in this step whether a plurality of past operation records exist in the memory unit 10.

If the increment variable k is "2" (YES in the step S309), the user enters which one of the banks 2, 3, 4 is discharge or charged in each period of the operation cycle via the touch panel displaced in the display unit 11 in a manner similar to the step S304 prior to starting the operation (a step S310). Then, it is determined whether the content entered in the step S310 corresponds to the past operation record stored in the step S306 (a step S311). If the entered content corresponds to the past operation record stored in the step S306 (YES in the step S311), the operation starts in accordance with the charge-discharge pattern the same as the past operation record with addition of a safety factor so as to control the charge and discharge of the banks 2, 3, 4 (a step S312). The safety factor herein is a margin that is applied to the charging rate of each of the banks 2, 3, 4 in the charge-discharge pattern to avoid overdischarge or overcharge of each of the banks 2, 3, 4 (i.e. SOC) in the charge-discharge pattern.

After the operation of the garbage truck 1 in the step S312, which one of the banks 2, 3, 4 is charged or discharged is stored in the memory unit 10 in each period as the past operation record by associating it with the content entered in the step S310 (a step S313). After storing the past operation record in the memory unit 10 in this manner, the controller 15 adds "1" to the increment variable k and stores it in the memory unit 10 to update the increment variable k (steps S314 and S315). Then the process returns to the step S301 to transit to a process described below.

In contrast, if the entered content does not correspond to the past operation record stored in the step S306 (NO in the step S311), the steps S303 to S308 are performed in a repeated manner to store the operation records. For a supplemental explanation, without a plurality of past operation records existing in the step S306, the statistic estimation process from the step S316 cannot be performed. Thus, the steps S303 to S308 are repeated to store the past operation records so that the statistic estimation process using the past operation records can be performed in a following process turn.

If the increment variable k is not "2" (NO in the step S309), there is a plurality of the past operation records stored in the memory unit 10. In this case, the controller obtains the past operation records from the memory unit 10 (a step S316).

Next, the controller 15 obtains an external factor generating variations of the past operation records (a step S317).

Herein, the external factor may include, for instance, a change of an expected amount of garbage and weather (outdoor air temperature, humidity and the like) of a day of the operation. The external factor of this type may be obtained from a content entered by the user via the input unit for the case of the expected amount of garbage, or may be obtained from values measured by a variety of sensors such as an outside air temperature indicator, a speed sensor (both not shown in FIG. 1) and the like that are mounted to the garbage truck for the case of the weather.

Based on a plurality of the operation records obtained in the step S316 and the external factor obtained in the step S317, the charge-discharge pattern of the banks 2, 3, 4 for each period of the operation cycle is statistically estimated (a step S318). More specifically, when the banks 2, 3, 4 are used singularly or in combination in the situation that a particular external factor exists, statistics of an aging variation of the SOC of each bank 2, 3, 4 is collected and a mean value $\mu$ and a standard deviation $\sigma$ are obtained. Then, the charge-discharge pattern of the banks 2, 3, 4 in each period of the operation cycle is estimated so that the estimated charge-discharge pattern falls within a range of $\mu \pm n\sigma$ (n is an integer set in accordance with a degree of the external factor obtained in the step S317).

In the above estimation control, the estimation is statistically performed after defining each period of the operation cycle in advance. This is not limitative and the estimation may be performed for each hour instead of each period as described above. Further, the estimation may be performed from an earliest operation time, a latest ending time or an intermediate time between the earliest operation time and the latest ending time of each period.

When operating the garbage truck 1 according to the charge-discharge pattern of the banks 2, 3, 4 estimated in the above manner, it is preferable to reduce the risk of overcharge or overdischarge of the banks 2, 3, 4 by applying a prescribed safety factor. In this case, it is preferable to obtain the prescribed safety factor by static process based on the past operation as well.

As described above, by controlling the power control circuit 7 based on the operation information, it is possible in the garbage truck 1 according to the present embodiment to change the connection state between the bank 2, 3, 4 and the charge unit 5 as well as the connection state between the bank 2, 3, 4 and the load unit 6. Thus, depending on the operation pattern of the garbage truck 1 in the operation cycle, it is possible to charge at least one battery pack selected among the banks 2, 3, 4 by connecting the selected battery pack to the charge unit 5, and also to discharge the remaining battery packs to the load unit 6. As a result, it is possible to flexibly control the charge-discharge control of the banks 2, 3, 4.

INDUSTRIAL APPLICABILITY

The present invention is applicable, for instance, to a battery system for a movable object and a controlling method for the battery system formed by a plurality of battery packs constituted of secondary cells mounted on the movable object with a load unit including a plurality of loads electrically driven for different purposes.

The invention claimed is:

1. A battery system for a movable object on which the battery system is mounted and which comprises a charger and a load unit including a travel load electrically driven for traveling the movable object and a work load electrically driven for performing an operation other than traveling the movable object, the battery system comprising:

a plurality of battery packs formed by connecting a plurality of secondary cells in series or in parallel;

a power control circuit for changing a connection state between the plurality of battery packs and the charger and a connection state between the plurality of battery packs and the load unit;

a memory for storing in advance operation information about operation patterns including an operation cycle including a travel cycle for traveling and stopping the movable object by the travel load and a work cycle for driving and stopping the work load and chargeability/non-chargeability that is set in accordance with the operation cycle; and an estimation unit for estimating a power consumption pattern in the travel and work cycles based on the operation information stored in the memory, wherein the power control circuit controls changing of the connection state between the plurality of battery packs and the load unit based on the power consumption pattern estimated by the estimation unit and the operation information stored in the memory, so as to control changing of a state of each of the plurality of battery packs among a charge state, a discharge state and a stand-by state to cover the power consumption of the load unit, the battery pack not being charged or discharged in the stand-by state.

2. The battery system for the movable object according to claim 1, wherein the controller:

calculates an amount of power consumption during a prescribed period of time in the operation cycle based on the power consumption pattern having been estimated by the estimation unit; and controls changing of the state of each of the plurality of battery packs among the charge state, the discharge state and the stand-by state using the power control circuit so that total power discharge from a battery pack of the plurality of battery packs during the prescribed period of time becomes greater than the calculated amount of power consumption, said battery pack of the plurality of battery packs discharging power to cover the power consumption.

3. The battery system for the movable object according to claim 2, further comprising:

a charge level obtaining unit for obtaining a current charge level of the plurality of battery packs, wherein the controller controls changing of the state of each of the plurality of battery packs among the charge state, the discharge state and the stand-by state using the power control circuit so as to keep the obtained charge level within a prescribed range.

4. The battery system for the movable object according to claim 2, further comprising:

an input unit for inputting the operation information to the memory.

5. The battery system for the movable object according to claim 2, wherein the plurality of secondary cells are lithium-ion cells.

6. The battery system for the movable object according to claim 1, wherein the controller:

calculates an amount of power consumption during a prescribed period of time in the operation cycle based on the power consumption pattern having been estimated by the estimation unit; and controls changing of the state of each of the plurality of battery packs among the charge state, the discharge state and the stand-by state using the power control circuit at a position where the movable object stops so that total power discharge from a battery pack of the plurality of battery packs during the prescribed period of time becomes the closest to the calculated amount of power consumption, said battery pack of the plurality of battery packs discharging power to cover the power consumption.

7. The battery system for the movable object according to claim 6, further comprising:
a charge level obtaining unit for obtaining a current charge level of the plurality of battery packs,
wherein the controller controls changing of the state of each of the plurality of battery packs among the charge state, the discharge state and the stand-by state using the power control circuit so as to keep the obtained charge level within a prescribed range.

8. The battery system for the movable object according to claim 6, further comprising:
an input unit for inputting the operation information to the memory.

9. The battery system for the movable object according to claim 6,
wherein the plurality of secondary cells are lithium-ion cells.

10. The battery system for the movable object according to claim 1, further comprising:
a charge level obtaining unit for obtaining a current charge level of the plurality of battery packs,
wherein the controller controls changing of the state of each of the plurality of battery packs among the charge state, the discharge state and the stand-by state using the power control circuit so as to keep the obtained charge level within a prescribed range.

11. The battery system for the movable object according to claim 10, further comprising:
an input unit for inputting the operation information to the memory.

12. The battery system for the movable object according to claim 10,
wherein the plurality of secondary cells are lithium-ion cells.

13. The battery system for the movable object according to claim 1, further comprising:
an input unit for inputting the operation information to the memory.

14. The battery system for the movable object according to claim 13,
wherein the operation cycle is settable and the state of the each battery group is selectable from the charge state, the discharge state and the stand-by state for each operation cycle by means of the input unit.

15. The battery system for the movable object according to claim 14,
wherein the travel load and the work load are drivable independently.

16. The battery system for the movable object according to claim 14,
wherein the plurality of secondary cells are lithium-ion cells.

17. The battery system for the movable object according to claim 13,
wherein the plurality of secondary cells are lithium-ion cells.

18. The battery system for the movable object according to claim 1,
wherein the plurality of secondary cells are lithium-ion cells.

19. An industrial vehicle comprising the battery system for the movable object described in claim 1.

20. A method of controlling a battery system for a movable object on which the battery system is mounted and which comprises a charger and a load unit including a travel load electrically driven for traveling the movable object and a work load electrically driven for performing an operation other than traveling the movable object, the battery system comprising a plurality of battery packs formed by connecting a plurality of secondary cells in series or in parallel and a power control circuit for changing a connection state between each of the plurality of battery packs and the charger and a connection state between each of the plurality of battery packs and the load unit, said method comprising the steps of:
storing in advance information about operation patterns including chargeability/non-chargeability that is set in accordance with an operation cycle including a travel cycle for traveling and stopping the movable object by the travel load and a work cycle for driving and stopping the work load;
estimating a power consumption pattern in the travel and work cycles based on the stored operation information; and
controlling changing of a connection state between the battery pack and the load unit by means of the power control circuit based on the estimated power consumption power and the stored operation information so as to control changing of a state of each of the plurality of battery packs among a charge state, a discharge state and a stand-by state to cover the power consumption of the load unit, the battery pack not being charged or discharged in the stand-by state.

* * * * *